March 4, 1924.

A. M. DUDLEY 1,485,375

CONTROL MECHANISM FOR INDUCTION MOTORS

Filed Nov. 4, 1918

WITNESSES:
H. J. Shelhamer
David Rines

INVENTOR
Adolphus M. Dudley
BY
Wesley G. Carr
ATTORNEY

Patented Mar. 4, 1924.

1,485,375

UNITED STATES PATENT OFFICE.

ADOLPHUS M. DUDLEY, OF OAKMONT, PENNSYLVANIA, ASSIGNOR TO WESTINGHOUSE ELECTRIC & MANUFACTURING COMPANY, A CORPORATION OF PENNSYLVANIA.

CONTROL MECHANISM FOR INDUCTION MOTORS.

Application filed November 4, 1918. Serial No. 260,988.

*To all whom it may concern:*

Be it known that I, ADOLPHUS M. DUDLEY, a citizen of the United States, and a resident of Oakmont, in the county of Allegheny and State of Pennsylvania, have invented a new and useful Improvement in Control Mechanism for Induction Motors, of which the following is a specification.

My invention relates to control systems for induction motors and it has particular relation to systems for controlling the speed of such motors.

In the operation of adjustable-speed induction motors, it is usually necessary to change the line connections from one set of terminals to another set in order to change the speed. In most cases, a considerable difference of potential exists between the corresponding pairs of terminals and it is desirable that a change from low-potential to high-potential connections shall be effected gradually without opening the circuits of the several windings and without short-circuiting the portions of the windings included between the corresponding pairs of terminals. It is furthermore desirable that the transition be made without loss of torque, in order to avoid mechanical shocks and damages consequent thereupon.

An object of my invention is to provide an improved control system for induction motors which shall have the above mentioned desirable characteristics.

Another object of my invention is to provide a novel combination and sub-combinations for effecting the desired result.

I provide an arrangement by means of which the change from low to high-speed connections may be effected through the medium of a reactance device, the reactance of which may be decreased from a high to a low value, whereupon this device may be short-circuited and the motor left directly connected to the line at high voltage. The variation of the reactance of the reactance device and the connections of the motor to the line are both controlled by a common actuating member.

Figure 1:
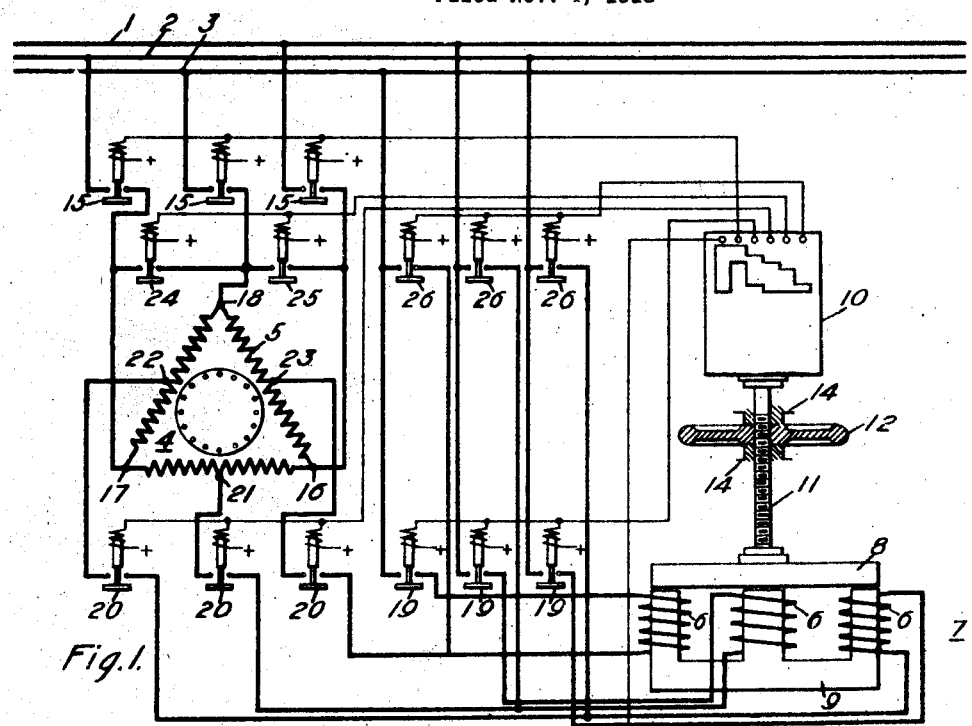
Figure 2:
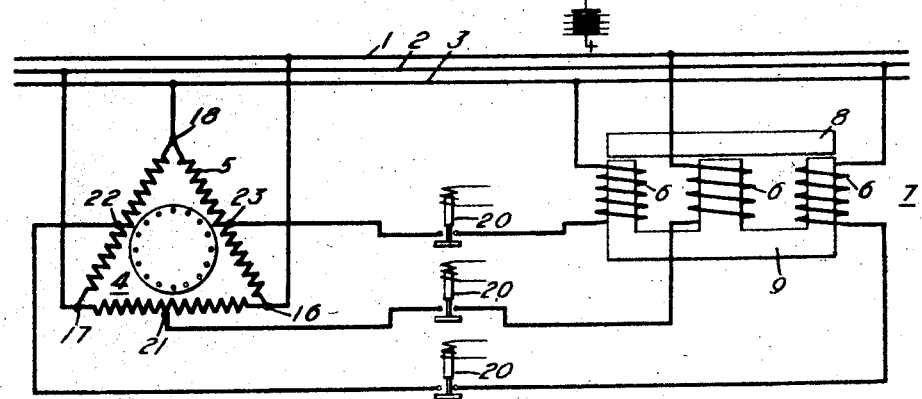
Figure 3:
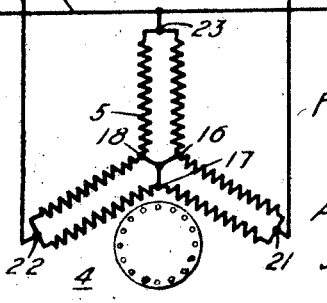

The details of my invention will be described in connection with the accompanying drawings in which Fig. 1 is a diagrammatic view of circuits and apparatus embodying my invention, the parts being shown when the motor is disconnected from the line. Fig. 2 is a diagrammatic view of the circuits at an intermediate stage of the transition from low to high-speed connections. Fig. 3 diagrammatically represents the motor windings connected to the line at high voltage at the end of the transition period.

Line conductors 1, 2 and 3 of a three-phase transmission line, which may be connected to any suitable source of electrical energy, supply current to an induction motor 4 having a primary winding 5. The motor here shown is of the squirrel-cage type but a motor of any suitable type may be employed. Each phase section of the primary winding 5 is adapted to be connected to a coil 6 which surrounds a leg of a reactance device 7 which consists of a laminated structure similar to that of the usual electromagnet, and is provided with a movable armature member 8 which operates to vary the air gaps between it and the several legs of the core 9. A controller 10, which operates to control the circuit connections of the coils 6 and the primary winding 5, is mechanically connected to the movable armature member 8 by means of a threaded shaft 11. A hand-wheel 12, which is mounted upon this shaft 11 between stationary supports 14, operates to actuate the controller 10 and the armature member 8 simultaneously.

A plurality of electromagnetic switches 15 are adapted to close to connect the vertices 16, 17 and 18 of the primary winding 5, to the line conductors 1, 2 and 3. A plurality of switches 19 may be closed to connect the coils 6 to the line conductors. The switches 20 may be closed to connect intermediate points 21, 22 and 23 of the primary winding 5 into circuit with the coil 6. A pair of switches 24 and 25, upon closing, connect the terminal points 17 and 18, as also the terminal points 16 and 18, together. The switches 26 serve to short-circuit the coils 6. All of the above-named switches are directly controlled by the controller 10 which, though here shown as of the electromagnetic type, may be of any other type and may, indeed, be dispensed with entirely, the controller 10, in that event, directly making the necessary connections.

I have shown the circuits so arranged that the switches 15 will be closed, in the first position of the controller 10, to connect the vertices 16, 17 and 18 of the delta-connected primary winding 5 to the line conductors 1, 2 and 3. The winding 5 is thereby connected in delta for low-speed operation. The other switches are, at this time, open. In order to effect the transition connections from low-speed to high-speed, the hand-wheel 12 is rotated to actuate the controller 10 upwardly. When the controller 10 is in its first operative position, the switches 15 are closed. In the second position of the controller 10, the switches 19 will be closed to connect the coils 6 of the reactance device 7 to the line conductors 1, 2 and 3. The connections as thus far described are diagrammatically illustrated in Fig. 2, the switches 15 and 19 being omitted for clearness. This arrangement serves to excite the reactance device 7. The operation of the motor 4 is still at low speed. The next step of the controller serves to energize the actuating coils of the switches 20 to connect the midpoints 21, 22 and 23 of the primary windings 5 to the line conductors 1, 2 and 3 through the coils 6. At the same time, the switches 15 are opened to sever the connections between the line conductors and the vertices 16, 17 and 18. The next step of the controller 10 causes the closing of the switches 24 and 25. The motor is now in the intermediate stage between the low and the high-speed connections.

Since the reluctance of the magnetic circuits that are energized by the several coils 6 is relatively low, the reactance of the device will be correspondingly high, and the voltage applied to the primary windings will be relatively low. The continued rotation of the hand-wheel 12 operates to further increase the length of the several air gaps and thus to correspondingly increase the reluctance of the several magnetic curcuits. The result is to decrease gradually the voltage of the reactance device and, therefore, to increase the voltage applied to the primary winding 5 of the motor to approximately that of the source. When the controller 10 has reached the end of its path of movement, the switches 26 will be closed to short-circuit the coils 6, and the switches 19 will be opened. The motor is then connected, at full voltage, directly to the line conductors, with the winding 5 in parallel-star arrangement for operation at high speed. The ultimate connections are diagrammatically shown in Fig. 3.

I have thus provided an improved control system for a two-speed induction motor, the primary winding of which is delta-connected for low-speed and star-connected for high speed, the transition connections of which are effected without a sudden change in potential and without opening the motor circuits during the transition. It will be understood, however, that my invention may be employed in connection with any other form of winding, and I wish it to be understood that further modifications may be made without departing from the spirit of my invention as set forth in the appended claims.

I claim as my invention:

1. The combination with a source of energy and an electric motor having a delta-connected polyphase winding connected at its vertices to said source of energy, of means for transferring the circuit connections from said vertices to intermediate points of the phase sections and for arranging the phase sections in Y-connection, said means comprising an impedance device and means for varying the reluctance of the magnetic circuit of said device.

2. The combination with a source of energy and an electric motor having a delta-connected polyphase winding connected at its vertices to said source of energy, of means for transferring the circuit connections from said vertices to intermediate points of the phase sections and for arranging the phase sections in Y-connection, said means comprising a variable reactance device, and unitary means for controlling the reactance of said device member and the connections of said winding to said source.

3. The combination with an alternating-current motor having a polyphase primary winding the phase sections of which are connected to form vertices, of means for connecting a source of current to said vertices, and means for transferring the connections from said vertices to intermediate points of the phase sections, said transferring means comprising a reactance device, means for decreasing the reactance of said reactance device and means for short-circuiting said reactance device when its reactance is at a minimum value.

4. The combination with an electric motor having a delta-connected primary winding, a source of alternating current and a reactance device, of means for successively connecting said winding to said source for low-speed operation, connecting said reactance device to said source and to said motor, arranging said primary winding in star-connection and then rendering said device ineffective.

5. The combination with a source of energy, an alternating-current motor having a delta-connected polyphase primary winding and an impedance device, of means for connecting the vertices of said winding to said source, means for connecting said impedance device to said source, means for connecting said impedance device to intermediate points of the phase sections, means for rendering said first means inoperative, means for arranging the phase sections in Y-connection, means for decreasing the impedance of said impedance device and means for short-circuiting said impedance device.

6. The combination with a source of energy, an alternating-current motor having a delta-connected polyphase primary winding and a reactance device, of means for connecting the vertices of said winding to said source, means for connecting said reactance device to said source, means for connecting said reactance device to intermediate points of the phase sections, means for rendering said first means inoperative, means for arranging the phase sections in Y-connection, means for decreasing the reactance of said reactance device, means for short-circuiting said reactance device, and unitary means for controlling the successive operations of all the above-mentioned means.

7. The combination with an alternating-current motor having a primary winding arranged to be connected in delta or in star for operation at different speeds, of a reactance device for controlling the voltage applied to said motor during the transition from one connection to the other, and means for controlling the electrical connections of said motor and the reactance of said device.

8. The combination with an alternating-current motor having a primary winding arranged to be connected in delta or in star for operation at different speeds, of a reactance device for controlling the voltage applied to said motor during the transition from one connection to the other, and means for simultaneously controlling the electrical connections of said winding and varying the reactance of said device.

In testimony whereof, I have hereunto subscribed my name this 30th day of Oct. 1918.

ADOLPHUS M. DUDLEY.